No. 743,995. PATENTED NOV. 10, 1903.
J. M. M. TRUFFAULT.
ANTIVIBRATION DEVICE FOR VEHICLES.
APPLICATION FILED JAN. 8, 1903.
NO MODEL. 2 SHEETS—SHEET 1.
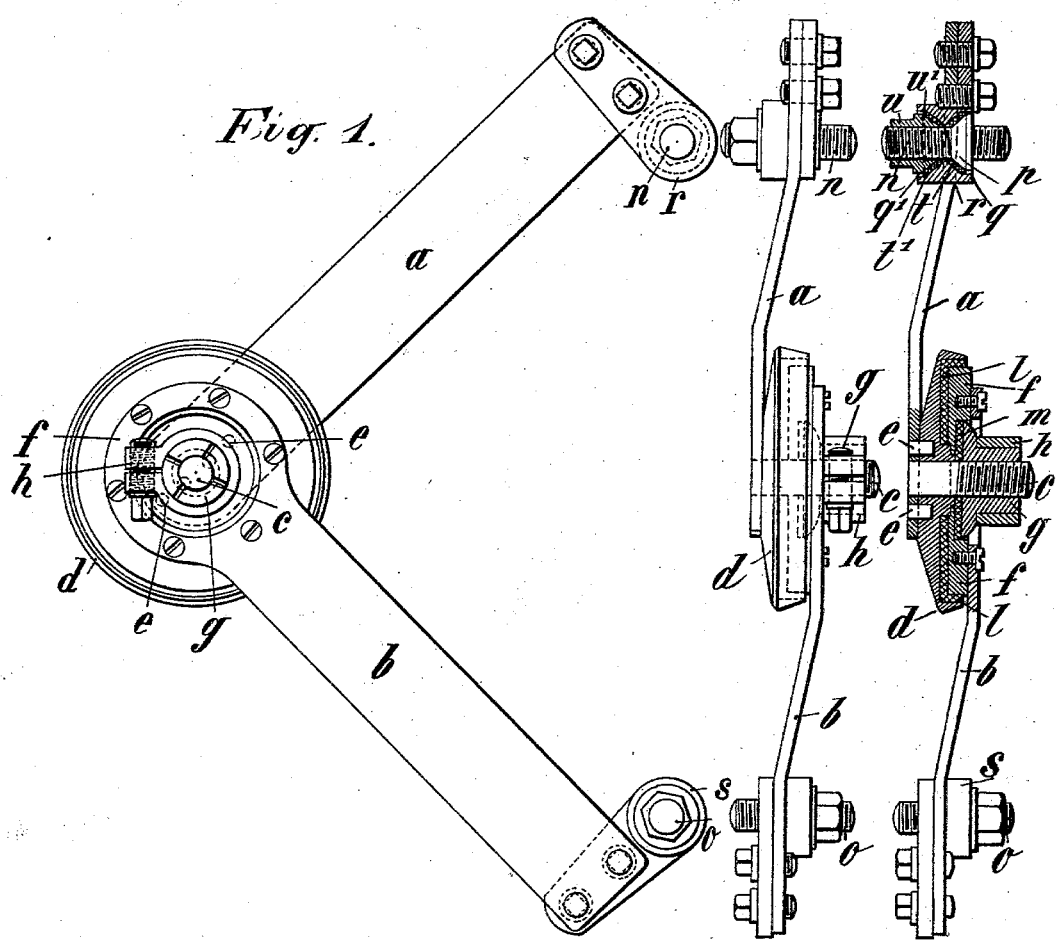
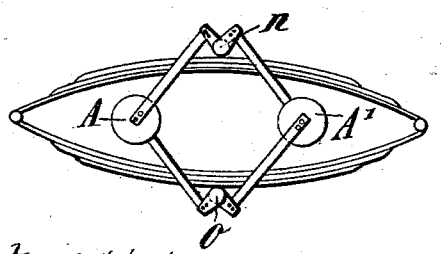
Witnesses
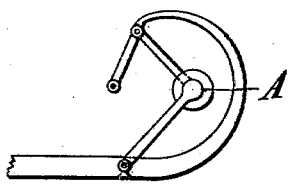
Inventor.
Jules M. M. Truffault
by Henry Connell
Attorney No. 743,995. PATENTED NOV. 10, 1903.
J. M. M. TRUFFAULT.
ANTIVIBRATION DEVICE FOR VEHICLES.
APPLICATION FILED JAN. 8, 1903.
NO MODEL. 2 SHEETS—SHEET 2.
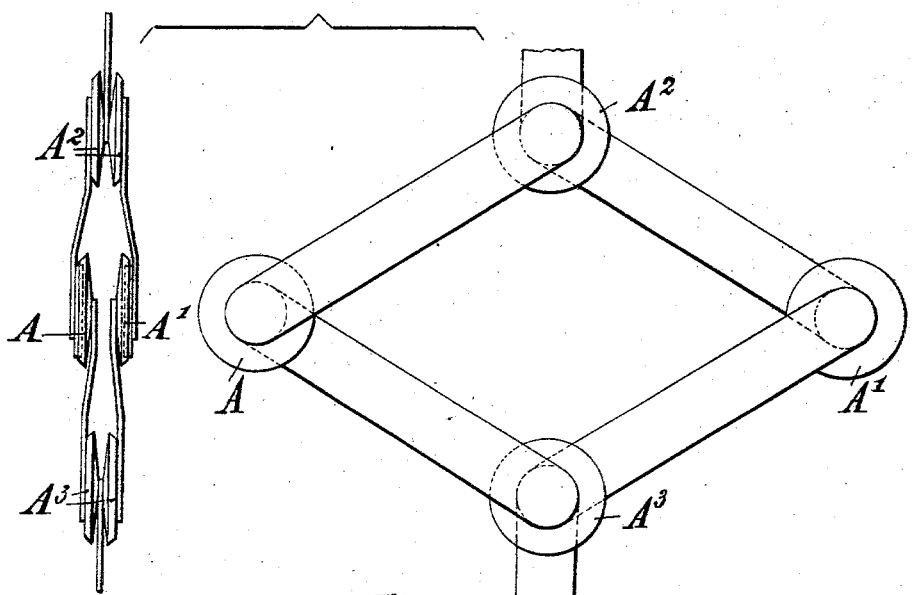
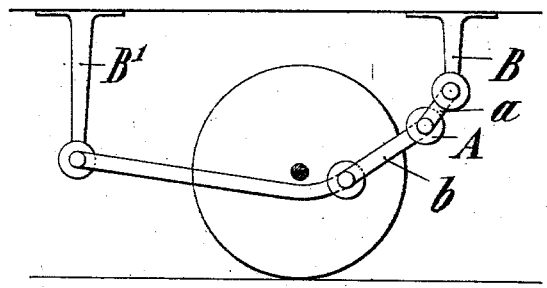
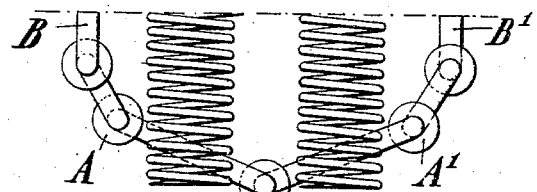

No. 743,995. Patented November 10, 1903.

UNITED STATES PATENT OFFICE.

REISSUED

JULES MICHEL MARIE TRUFFAULT, OF PARIS, FRANCE, ASSIGNOR OF FIFTY-ONE ONE-HUNDREDTHS TO EDWARD V. HARTFORD.

ANTIVIBRATION DEVICE FOR VEHICLES.

SPECIFICATION forming part of Letters Patent No. 743,995, dated November 10, 1903.

Application filed January 8, 1903. Serial No. 138,293. (No model.)

*To all whom it may concern:*

Be it known that I, JULES MICHEL MARIE TRUFFAULT, engineer, of 51 Avenue des Ternes, in the city of Paris, Republic of France, have invented Improvements in or Relating to Antivibration Devices for Vehicles, of which the following is a full, clear, and exact description.

In order to diminish shocks and vibrations in vehicles resulting from unevenness of the ground, &c., various types and sizes of springs have been interposed between the carriage-frame and the axles. However, these springs, owing to their elasticity and freedom of motion, transmit the shocks and vibrations due to the unevenness of the road to the whole of the vehicle. These continuous shocks, particularly when traveling at a high speed, are disagreeable to the passengers and are often a cause of deterioration of the vehicle itself. To overcome these drawbacks is the object of the present invention, which consists in combining with the ordinary means of suspension a device whereby the return of the springs or suspension devices to their initial position takes place gradually, thus avoiding the transmission of shocks to the vehicles, which hitherto was not possible owing to the return of the springs taking place in a sudden manner. Such arrangement, which can be carried out in various ways, according to the construction of the vehicle to which it is applied, comprises one or more frictional folding parts or joints, one arm being attached to the frame and the other secured upon the axle of the carriage. With this arrangement when the wheels receive a shock the arms of the folding joint, partaking in the movement of their points of attachment, approach each other and offer resistance to the motion at their point of articulation, whereby the displacement of the carriage-frame relatively to the axle is reduced and rendered less sudden. The supplementary rigidity of movement being the same in both directions, the action of the spring takes place gradually to return the carriage-frame to its normal position. From this short explanation it will be seen that this invention has for its object to continuously break or restrain the suddenness of the spring action, and thus cause the vehicle to run with great ease and steadiness.

This antivibration device is represented in the accompanying drawings, in which—

Figure 1 is an elevation. Fig. 2 is a side view. Fig. 3 is a section. Figs. 4 to 8 show several applications of the device.

In the figures the same letters of reference denote the same parts.

As shown in Figs. 1 to 3, the frictional hinge device comprises arms $a\,b$, with their end portions frictionally clamped together and mounted upon a bolt or stud $c$. One arm, $a$, carries a socket or flanged disk $d$, with which it is rigidly connected by rivets $e$. The other arm, $b$, carries a corresponding disk or plate $f$, fitting in the socket $d$ and clamped thereto by a nut $g$, screwed on the threaded end of the stud $c$. This nut is split, as shown in Fig. 1, and is held completely immovable upon the stud $c$ by a screw-collar $h$. A leather washer is interposed between the socket $d$ and the disk $f$, and a screw-washer $m$ is fitted between the latter and the nut $g$. By tightening or loosening the nut $g$ the frictional contact between the socket and disk, and consequently between the two hinged arms, can be raised at will. The arms $a\,b$ carry at their other ends pivots $n\,o$, respectively, and mounted so as to produce a frictional action. Each of these pivots is constituted by a threaded rod having a conical part or nut $p$, adapted to fit in a socket $q$, which for this purpose comprises the parts $r\,s$, secured to the ends of the arms $a$ and $b$. A leather ring $t$ is interposed between the conical part or nut $p$ and the socket $q$. The cone $p$ is tightened against the leather insertion $t$ by a nut $u$, arranged upon the threaded portion $n\,o$ of the rod and having a conical front portion $u'$, which fits in the correspondingly-recessed portion of the socket $q'$ on the side of the parts $r\,s$ opposite to that on which the cone bears. A ring, $t'$, of leather is fitted between the recess $q'$ and the conical part $u'$ of the nut. Thus each of the rods or axles $n\,o$ has two conical parts $p$ and $u'$, which work with frictional action against the leather packings $t$ and $t'$, thereby producing a resistance adapted to take up or deaden the vibrations and oscillations of the carriage. One of the threaded rods, $n$, is attached to the axle and the other rod, $o$, to the frame of the carriage. This friction device can in a convenient manner be combined with the ordinary elastic suspension devices.

Fig. 4 shows a way of applying this invention, in which the friction device consists of two sets of disks A A', constructed as above described, the ends of their arms being capable of turning with a frictional action on the pivots $n$ $o$, one of which is fixed to the lower and the other to the upper part of an ordinary elliptical spring. The apparatus could also be applied to a C-spring, as shown, Fig. 5, or to other convenient forms of spring, Fig. 6. In this latter case the end of one of the arms of the device A can be mounted with a frictional action upon a support B on the frame of the carriage, while the end of the other arm, $b$, is attached to one end of a straight spring carried by the carriage-axle, the other end of this spring being mounted with a frictional action upon a support B', also secured to or depending from the frame of the carriage.

The antivibration device according to the present invention could also be arranged in the form of a parallelogram, Fig. 7. In this form it comprises four frictional disk devices, of which the two side ones A A' are single, while the top and bottom disks $A^2$ $A^3$, carried by the axle and by the frame of the carriage, respectively, are double.

The apparatus could, moreover, be combined with two buffer-springs, as shown in Fig. 8, the suspension being effected either by the arms of one, two, or more springs, as desired. In this case the apparatus consists of two single devices A A', the lower arms of which coöperate with a double frictional disk device $A^2$, fixed to or integral with the axle, while the upper arms are mounted with a frictional action on supports B B' on the frame of the carriage. It can be easily understood that these frictional devices allow of an easy displacement of the carriage-frame with regard to the axles, so as to deaden the shocks due to uneven roads, &c., while the different frictional surfaces of the antivibration devices offer a sufficient resistance in order to prevent vibration or oscillation of the springs, and consequently of the frame of the carriage. Moreover, the springs, which yield after each shock, effect the return of the frictional devices to their initial positions.

It is obvious that the apparatus according to this invention can be combined with all kinds of springs and that the form, dimensions, and arrangement of the parts can be modified according to necessity.

I claim—

1. An improved antivibration device for vehicles of all kinds, as hereinbefore described, in which every folding joint comprises two arms hinged together, one carrying a socket or flanged disk and the other a plate in frictional contact with the leather inserted within the socket and with a leather washer pressed against the plate by means of a nut screwed on a stud, substantially as described.

2. An improved antivibration device for vehicles of all kinds, as hereinbefore described, in which the arms of every folding joint are frictionally mounted on the one hand upon a stud secured upon the axle and on the other hand upon a stud secured upon the frame, each of these studs presenting two conical parts abutting against conical leather-lined surfaces presented by pivots mounted at the end of each of the arms of the folding joint, substantially as described.

The foregoing specification of my "Improvements in or relating to antivibration devices for vehicles" signed by me this 23d day of December, 1902.

JULES MICHEL MARIE TRUFFAULT.

Witnesses:
EDWARD P. MACLEAN,
MAURICE H. PIGNET.